United States Patent
Eberlein et al.

(10) Patent No.: US 9,022,450 B1
(45) Date of Patent: May 5, 2015

(54) VEHICLE INSTRUMENT PANEL ASSEMBLY

(71) Applicant: Nissan North America, Inc., Franklin, TN (US)

(72) Inventors: Michael Eberlein, Plymouth, MI (US); Aaron Andersen, Farmington, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/069,987

(22) Filed: Nov. 1, 2013

(51) Int. Cl.
    *B62D 25/14* (2006.01)

(52) U.S. Cl.
    CPC ....................................... *B62D 25/14* (2013.01)

(58) Field of Classification Search
    USPC .............................. 296/24.34, 70, 1.08; 180/90
    See application file for complete search history.

(56) References Cited

U.S. PATENT DOCUMENTS

| | | | |
|---|---|---|---|
| 2006/0186689 A1* | 8/2006 | Gresham et al. | 296/70 |
| 2008/0150307 A1* | 6/2008 | Quigley et al. | 296/24.34 |
| 2010/0194136 A1* | 8/2010 | Shiratori et al. | 296/70 |
| 2011/0187144 A1* | 8/2011 | Kwolek | 296/37.8 |
| 2013/0134729 A1* | 5/2013 | Zimmerman et al. | 296/24.34 |
| 2014/0239663 A1* | 8/2014 | Sandhu et al. | 296/70 |

FOREIGN PATENT DOCUMENTS

| JP | 02-128498 A | 5/1990 |
|---|---|---|
| JP | 2003-341385 A | 12/2003 |

OTHER PUBLICATIONS

2011 Hyundai Azera.

* cited by examiner

*Primary Examiner* — Jason S Morrow

(74) *Attorney, Agent, or Firm* — Global IP Counselors, LLP

(57) ABSTRACT

A vehicle instrument panel assembly includes a center stack assembly that has a main trim surface and an attachment surface with a peripheral edge surrounding the main trim surface. The peripheral edge includes a lower first side portion and a lower second side portion laterally opposite the lower first side portion. A first side trim surface extends from the lower first side portion of the peripheral edge and a second side trim surface extends from the lower second side portion of the peripheral edge. The first side trim surface and the second side trim surface are inclined toward one another such that the first side trim surface and the second side trim surface converge toward one another in a direction moving away from the main portion in a vehicle longitudinal direction.

19 Claims, 13 Drawing Sheets

VEHICLE INSTRUMENT PANEL ASSEMBLY

BACKGROUND

1. Field of the Invention

The present invention generally relates to an instrument panel that includes a center stack assembly. More specifically, the present invention relates to an instrument panel that includes a center stack assembly that is designed to have a floating appearance relative to areas of the instrument panel adjacent to the center stack assembly.

2. Background Information

Many current production vehicles are provided with a center stack of an instrument panel that includes, for example, audio controls, HVAC (heating ventilation and air conditioning) controls and/or a video display for showing images from one or more cameras disposed on the vehicle. Typically, the center stack is an unadorned portion of the instrument panel.

SUMMARY

One object of the disclosure is a center stack assembly of an instrument panel that protrudes rearward relative to adjacent surfaces of the instrument panel.

Another object of the disclosure is to provide a center stack assembly with a floating appearance relative to adjacent portions of the instrument panel.

In view of the state of the known technology, one aspect of the disclosure is a vehicle instrument panel assembly that has a center stack assembly. The center stack assembly has a main portion that includes a main trim surface and an attachment surface on an opposite side of the main portion from the main trim surface. A peripheral edge surrounds the main trim surface and includes an upper portion, a bottom portion, a lower first side portion, an upper first side portion, a lower second side portion laterally opposite the lower first side portion and an upper second side portion laterally opposite the upper first side portion. The center stack assembly further includes a first side trim surface and a second side trim surface opposite the first side trim surface. The first side trim surface and the second side trim surface are located on a side of the main portion defining the attachment surface. The first side trim surface intersects the main portion along the lower first side portion of the peripheral edge, and the second side trim surface intersects the main trim surface along the lower second side portion of the peripheral edge. The first side trim surface and the second side trim surface are inclined toward one another such that the first side trim surface and the second side trim surface converge toward one another in a direction moving away from the attachment surface of the main portion in a vehicle longitudinal direction.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
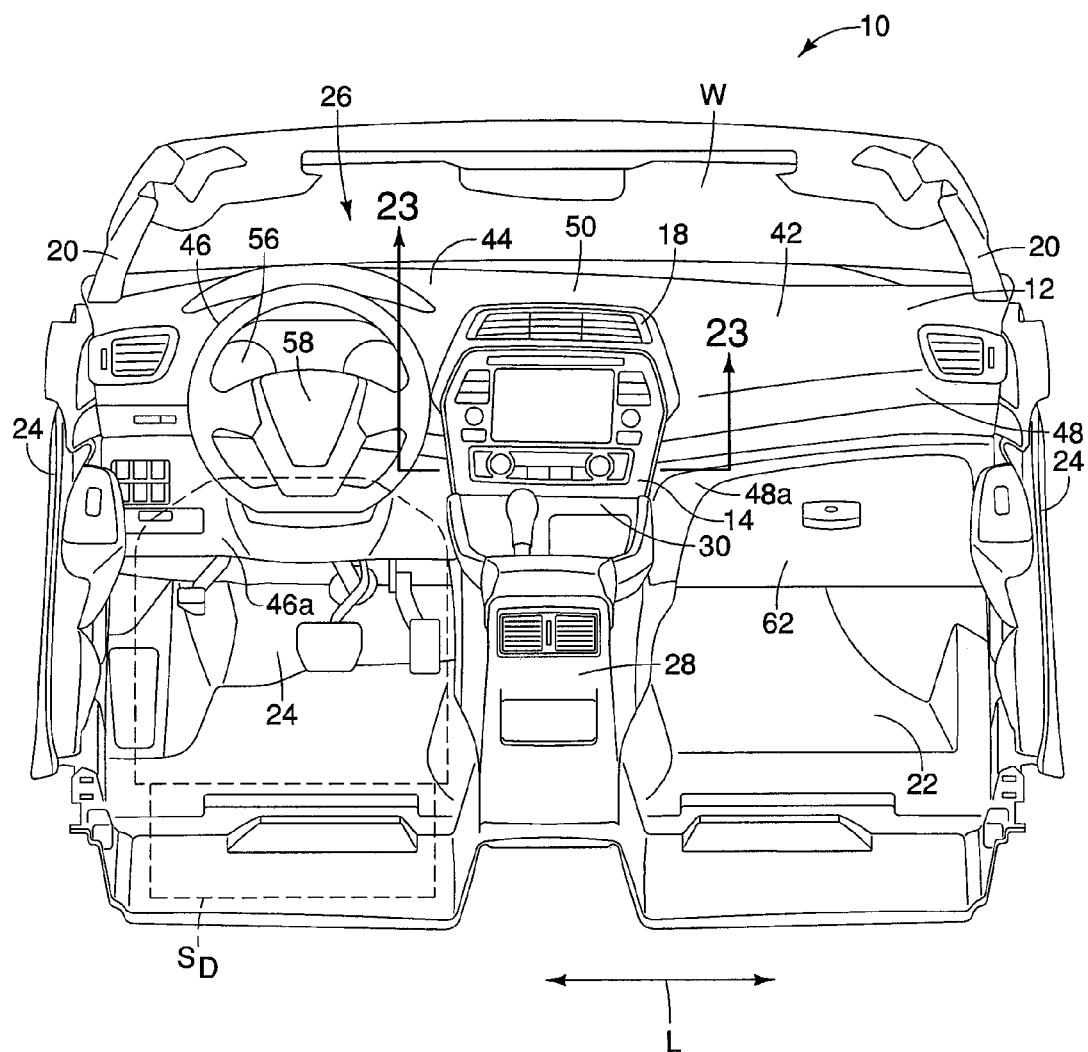
FIG. 1 is a perspective view of a passenger compartment of a vehicle showing an instrument panel assembly that includes a center stack assembly in accordance with an embodiment.

Referring initially to FIG. 1, a vehicle 10 having an instrument panel 12 that includes a center stack assembly 14 attached thereto is illustrated in accordance with a first embodiment. As described in greater detail below, the center stack assembly 14 is designed to have a floating appearance relative to the instrument panel 12 when viewed by a passenger sitting in a driver's seat $S_D$. More specifically, the center stack assembly 14 is supported by the instrument panel 12 but protrudes rearward from adjacent surface areas of the instrument panel 12. The center stack assembly 14 includes side trim surfaces 16a and 16b (see FIGS. 11, 12, 14, 21, 22 and 23) that are not visible from an area within the vehicle 10 occupied by a passenger sitting in the driver's seat $S_D$. The side trim surfaces 16a and 16b are dimensioned and positioned to provide the illusion that the center stack assembly 14 is floating relative to the remainder of the instrument panel 12, as described in greater detail below. A further trim panel 18 is installed to the instrument panel 12 above the center stack assembly 14.

A description of the instrument panel 12 and the center stack assembly 14 is provided below after a description of portions of the vehicle 10.

As shown in FIG. 1, the vehicle 10 basically includes A-pillars 20, a floor 22, a dash wall 24 and a windshield W that at least partially define a passenger compartment 26 within the body structure of the vehicle 10. The vehicle 10 also includes, among other things, the following features within the passenger compartment 26: the driver's seat $S_D$; a center console 28; the instrument panel 12; and the center stack assembly 14.

The driver's seat $S_D$ is mounted to the floor 22 in a conventional manner. The center console 28 is also mounted to the floor 22 in a conventional manner. The center console 28 also includes a front section 30 that aligns with and can optionally connect to the center stack assembly 14, as described in greater detail below.

Figure 2:
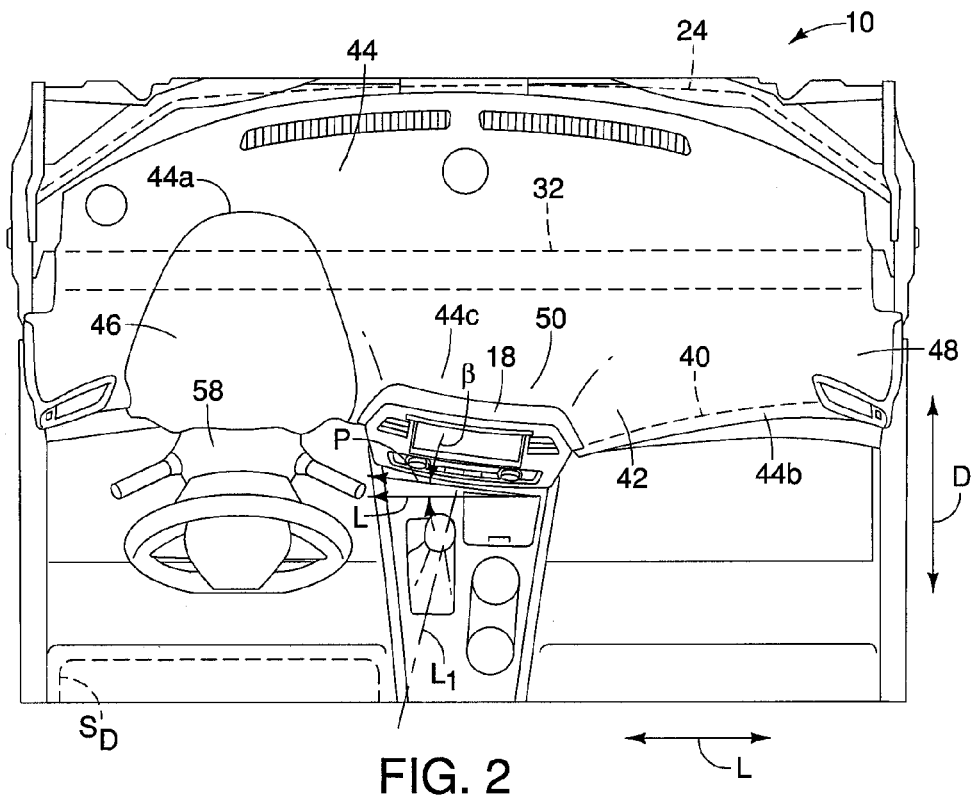
FIG. 2 is a top view of the passenger compartment showing the instrument panel assembly and the center stack assembly in accordance with the embodiment.

As shown in phantom in FIG. 2, the vehicle 10 also includes a steering member 32 that extends between ends of the dash wall 24 proximate to the A-pillars 20. The steering member 32 is a structural element of the vehicle 10 that is connected to the dash wall 24 and the A-pillars 20. Although not shown, the instrument panel 12 can be attached to the steering member 32 in a conventional manner.

A description of the instrument panel 12 is now provided with specific reference to FIGS. 1-8. The instrument panel 12 is installed within the passenger compartment 26 to, for example, one or more of the A-pillars 20, the dash wall 24 and the steering member 32. The instrument panel 12 extends from the A-pillar 20 on the driver's side to the A-pillar 20 on the passenger's side of the vehicle 10 and from the windshield W rearward. The instrument panel 12 is an assembly that includes a variety of features, including the center stack assembly 14.

The instrument panel 12 includes a structural core, for example, a main body 38, that is shaped and contoured to give the instrument panel 12 its overall shapes and contours. The main body 38 has a dash wall facing surface 40 (shown in FIGS. 2 and 23), a trim surface 42, an upper deck 44, an instrument cluster supporting section 46, a storage compartment supporting section 48 and a center stack supporting section 50.

The dash wall facing surface 40 is typically unadorned and mainly includes structures and projections (not shown) that support the instrument panel 12 to the A-pillars 20, the dash wall 24 and the steering member 32. The dash wall facing surface 40 also supports at least a portion of the center stack supporting section 50.

The trim surface 42 of the main body 38 can have a textured finish or can be covered with one or more decorative materials giving the instrument panel 12 a desired appearance. The trim surface 42, whether it is a textured finish or decorative materials covering the main body 38, is exposed within the passenger compartment 26. For example, the portion of the trim surface 42 that coincides with the upper deck 44 can be covered with a padded or other material with any of a variety of textures and appearances, such as wood grain, leather or others. The surface area of the trim surface 42 that defines the instrument cluster supporting section 46 can also be covered with the above mentioned material but can alternatively include chrome trim elements or other decorative materials that enhance the appearance of the instrument cluster 56. The surface area of the trim surface 42 that defines the storage compartment supporting section 48 can include the padded material, simulated wood grain or other decorative cover materials. The surface area of the trim surface 42 that defines the center stack supporting section 50 can also include the padded material, simulated wood grain or other decorative materials.

The upper deck 44 is a generally horizontal portion of the main body 38 of the instrument panel 12 that extends rearward in a vehicle longitudinal direction D (FIG. 2) from the windshield W. The upper deck 44 can include air vents for defogging the windshield W or for other heating and cooling functions. Since air vents are conventional elements, further description is omitted for the sake of brevity. A first rearward portion 44a of the upper deck 44 is located on the driver's side of the vehicle 10 and ends at the instrument cluster supporting section 46. Since the instrument cluster supporting section 46 is relatively large, the first rearward portion 44a of the upper deck 44 is located more forward of the storage compartment supporting section 48 and a center stack supporting section 50 relative to the vehicle longitudinal direction D.

A second rearward portion 44b of the upper deck 44 extends further rearward relative to the vehicle longitudinal direction D than the first rearward portion 44a and curves downward intersecting with the storage compartment supporting section 48. A central portion 44c of the upper deck 44 remains relatively planar extending back to the center stack supporting section 50. The central portion 44c extends further rearward in the vehicle longitudinal direction D than both the first rearward portion 44a and the second rearward portion 44b of the upper deck 44 of the main body 38 of the instrument panel 12.

Figure 3:
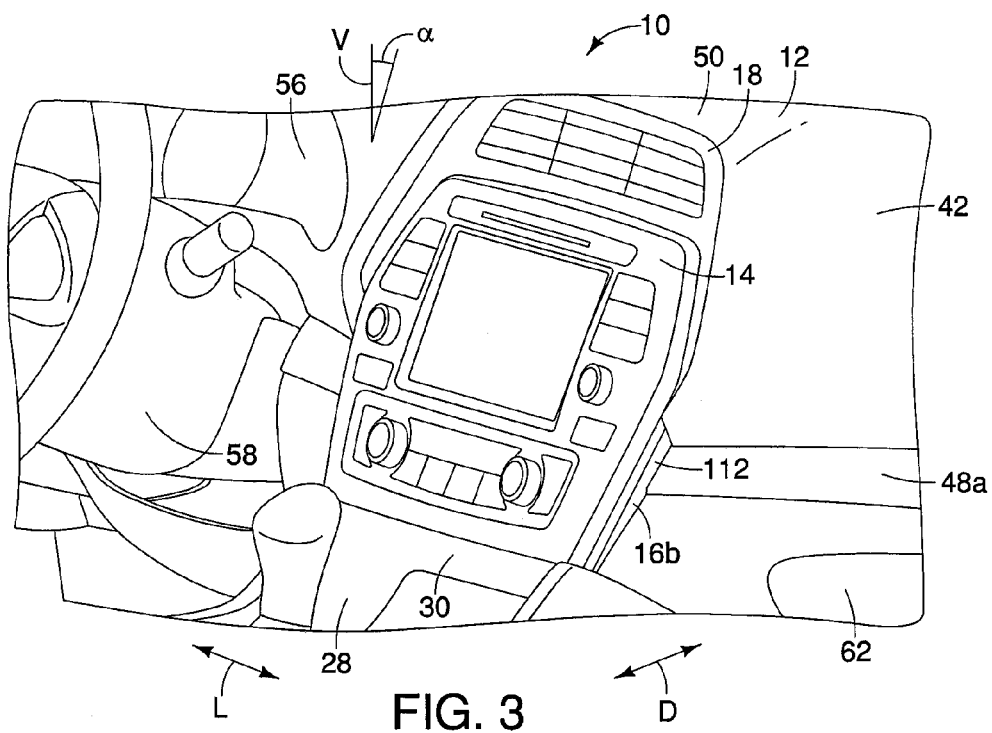
FIG. 3 is a perspective view of the center stack assembly installed to the instrument panel assembly in accordance with the embodiment.
Figure 4:
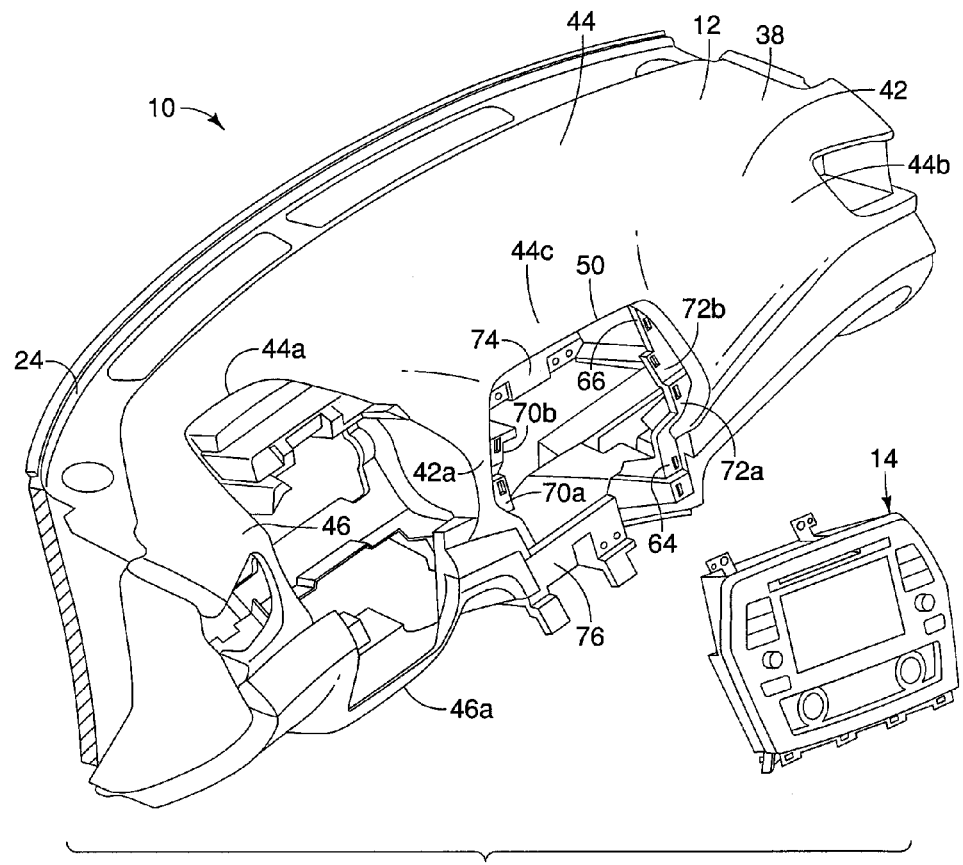
FIG. 4 is a perspective exploded view of portions of the instrument panel assembly and the center stack assembly in accordance with the embodiment.
Figure 5:
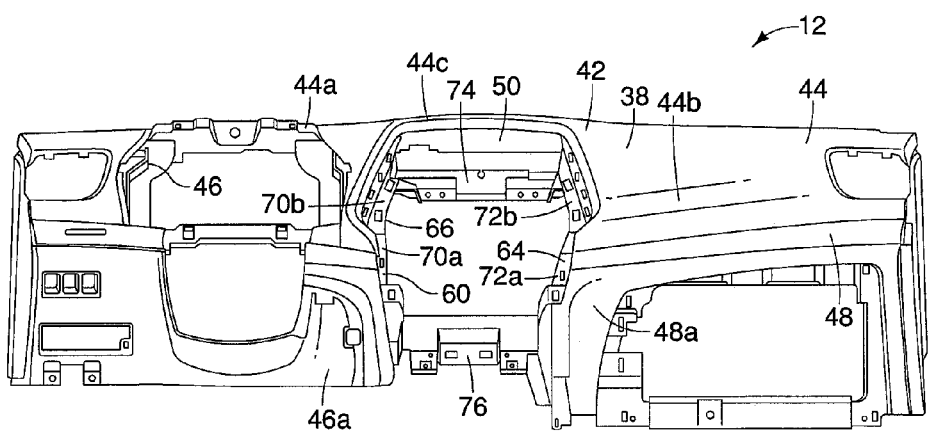
FIG. 5 is a front view of the instrument panel assembly with the center stack assembly removed, showing an instrument cluster supporting section, a center stack supporting section and a storage compartment supporting section in accordance with the embodiment.
Figure 6:
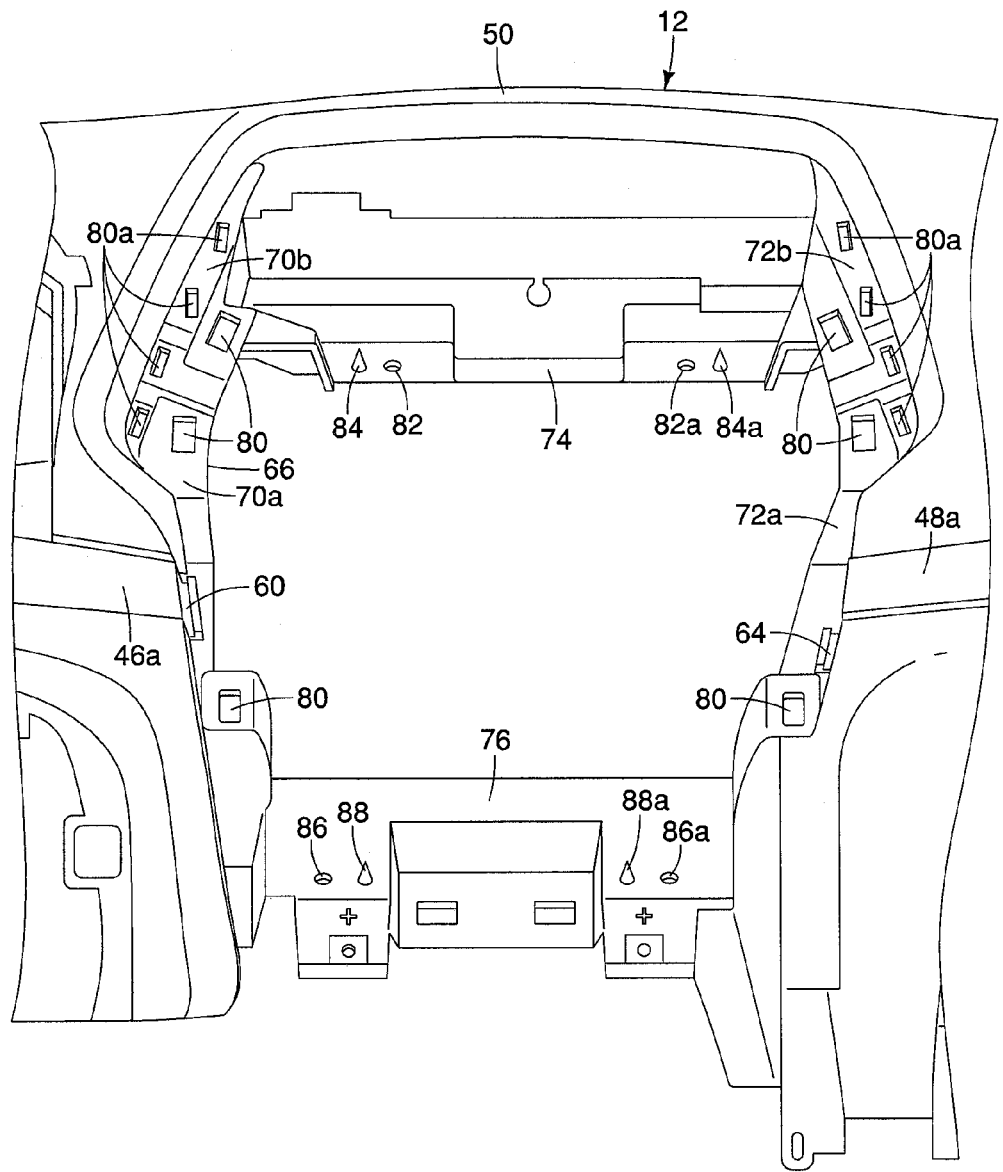
FIG. 6 is detailed view of the center stack supporting section of the instrument panel showing a first retaining portion, a second retaining portion and attachment flanges in accordance with the embodiment.
Figure 7:
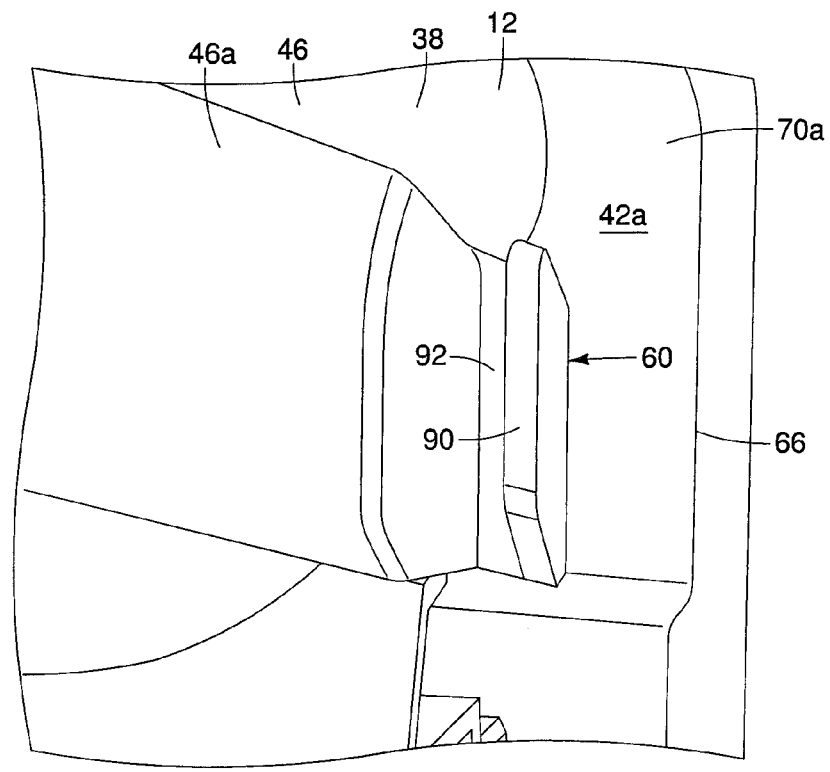
FIG. 7 is a detailed view of the center stack supporting section of the instrument panel showing a first retaining portion in accordance with the embodiment.

As shown in FIGS. 3 and 4, the instrument cluster supporting section 46 is an area of the main body 38 of the instrument panel 12 that is configured to receive and support the instrument cluster 56 and a steering column 58. A lower area of the instrument cluster supporting section 46 includes a separate trim panel 46a that extends to the center stack supporting section 50, as indicated in FIG. 5-7. The separate trim panel 46a can include a first retaining portion 60, as shown in FIG. 7. However, the first retaining portion 60 can alternatively be formed as part of the main body 38 of the instrument panel 12. A more detailed description of the first retaining portion 60 is provided below with a description of the center stack supporting section 50.

The instrument cluster 56 includes a plurality of electronic information indication devices such as, for example, a fuel level gauge, a speedometer, a tachometer, temperature gauge, etc. As shown in FIG. 4, the instrument cluster supporting section 46 includes a plurality of attachment flanges and attachment openings that support the instrument cluster 56 and the steering column 58 in a conventional manner. Since instrument clusters and steering columns are conventional structures, further description is omitted for the sake of brevity.

The storage compartment supporting section 48 is configured to conceal an airbag device (not shown) and includes a storage compartment or glove box 62. Since storage compartments and glove boxes located in instrument panels are conventional structures, further description is omitted for the sake of brevity.

Figure 8:
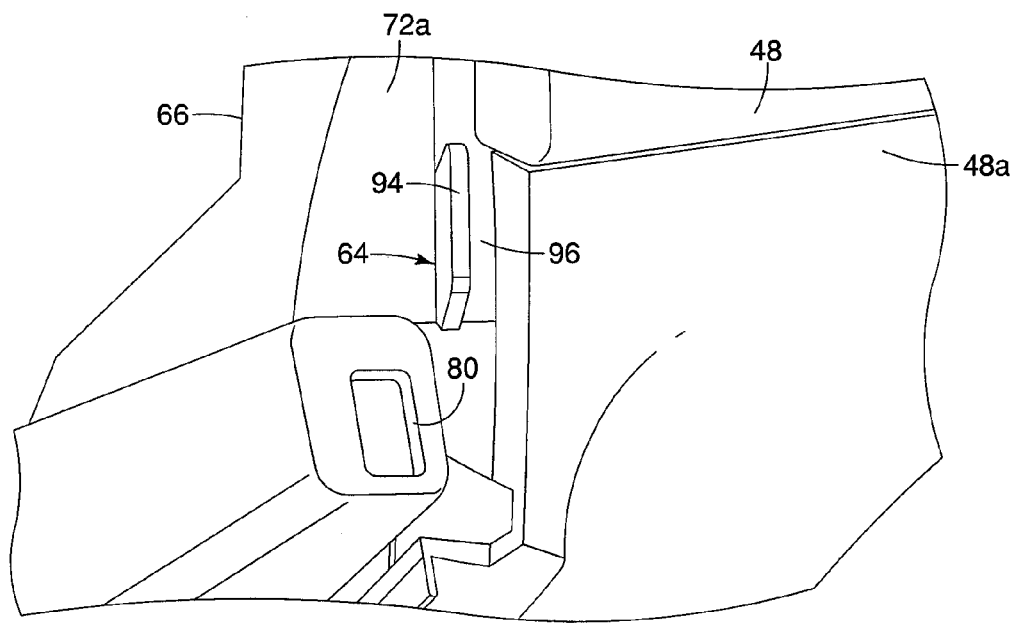
FIG. 8 is another detailed view of the center stack supporting section of the instrument panel showing a second retaining portion in accordance with the embodiment.

A lower portion of storage compartment supporting section 48 can include a separate trim panel 48a that extends from the storage compartment supporting section 48 and the center stack supporting section 50, as indicated in FIGS. 5, 6 and 8. The separate trim panel 48a includes a second retaining portion 64. However, in an alternative embodiment, the main body 38 of the instrument panel 12 can include the second retaining portion 64. A more detailed description of the second retaining portion 64 is provided below with a description of the center stack supporting section 50.

A description of the center stack supporting section 50 is now provided with specific reference to FIGS. 4, 5 and 6. The center stack supporting section 50 is centrally located with respect to the instrument panel 12. More specifically, the center stack supporting section 50 is located between the instrument cluster supporting section 46 and the storage compartment supporting section 48. The center stack supporting section 50 includes a central opening 66 defined by the main body 38 that extends from the dash wall facing surface 40 to the trim surface 42. A series of flanges 70a, 70b, 72a, 72b, 74 and 76 at least partially surround and/or define the central opening 66. The flanges 70a and 72a are located on a side of the central opening 66 adjacent to the instrument cluster supporting section 46. The flanges 70b and 72b are located on a side of the central opening 66 adjacent to the storage compartment supporting section 48. The flange 74 is located at an upper area of the central opening 66 and extends between the side of the central opening 66 adjacent to the instrument cluster supporting section 46 and the side of the central opening 66 adjacent to the storage compartment supporting section 48. The flange 76 is located at a lower area of the central opening 66 and extends between the side of the central opening 66 adjacent to the instrument cluster supporting section 46 and the side of the central opening 66 adjacent to the storage compartment supporting section 48.

The flanges 70a, 70b, 72a and 72b include a plurality of attachment apertures 80 that are configured to receive snap-fitting projections of the center stack assembly 14 that are described in greater detail below. The flanges 70b and 72b include a plurality of attachment apertures 80a that are configured to receive snap-fitting projections (not shown) of the trim panel 18.

The flange 74 includes apertures 82 and alignment projections 84 that are described in greater detail below. The flange 76 includes apertures 86 and alignment projections 88 that are described in greater detail below.

As shown in FIG. 7, the first retaining portion 60 of the separate trim panel 46a includes a projection 90 that extends in a rearward direction relative to the vehicle longitudinal direction D. The projection 90 and an adjacent surface of separate trim panel 46a define a recess 92.

As shown in FIG. 8, the second retaining portion 64 is formed on the separate trim panel 48a and includes a projection 94 that extends in a rearward direction relative to the vehicle longitudinal direction D. The projection 90 and an adjacent surface of the separate trim panel 48a define a recess 96.

A description of the center stack assembly 14 is now provided with specific reference to FIGS. 2, 3 and 9-19. The center stack assembly 14 basically includes a main portion 100, an audio/video device 102, a heating/cooling control panel herein after referred to as an HVAC controller 104, an attachment bracket 106, an attachment bracket 108, a first side trim panel 110 and a second side trim panel 112. However, it should be understood from the drawings and the description herein that the audio/video device 102 and the HVAC controller 104 can be replaced with other vehicle related controllers or can be omitted entirely and replaced with other structures in order to support the attachment brackets 106 and 108.

The main portion 100 is basically a trim panel that includes a main trim surface 120 and an attachment surface 122 on an opposite side of the main portion 100 from the main trim surface 120. The main trim surface 120 is bounded by a peripheral edge 124 that surrounds the main trim surface 120. The peripheral edge 124 includes an upper portion 130, a bottom portion 132, a lower first side portion 134a, an upper first side portion 134b, a lower second side portion 136a laterally opposite the lower first side portion 134a and an upper second side portion 136b laterally opposite the upper first side portion 134b.

Figure 14:
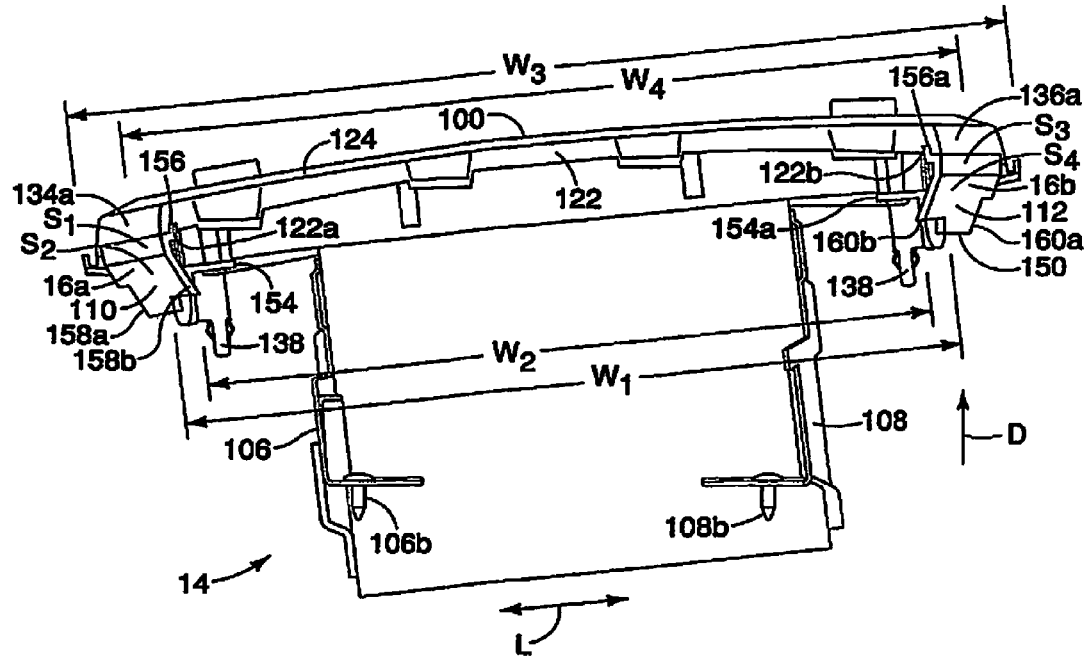
FIG. 14 is a bottom view of the center stack assembly showing the first side trim panel and the second side trim panel each with a retaining lip that extends in to a corresponding recess in the main portion in accordance with the embodiment.
Figure 15:
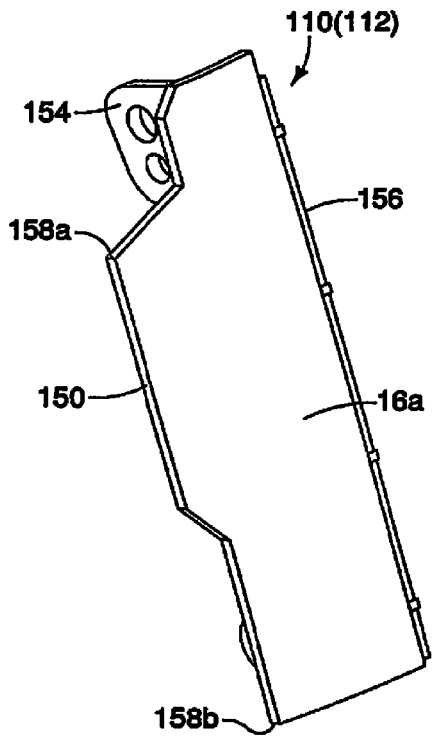
FIG. 15 is a first side view of the first side trim panel removed from the main portion of the center stack assembly showing a side trim surface and the retaining lip of the first side trim panel in accordance with the embodiment.
Figure 16:
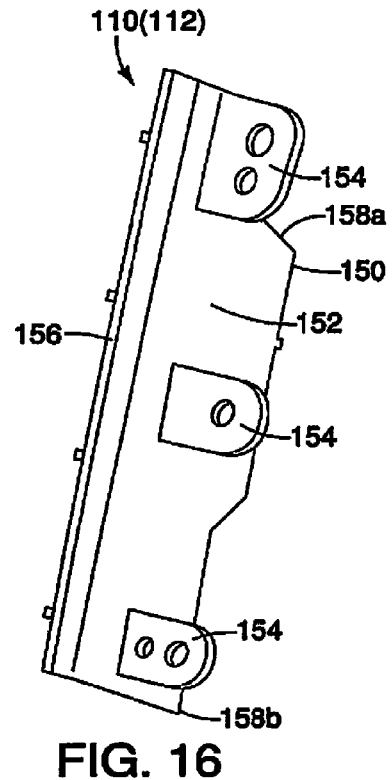
FIG. 16 is an opposite side view of the first side trim panel showing an attachment surface that includes attachment flanges in accordance with the embodiment.
Figure 17:
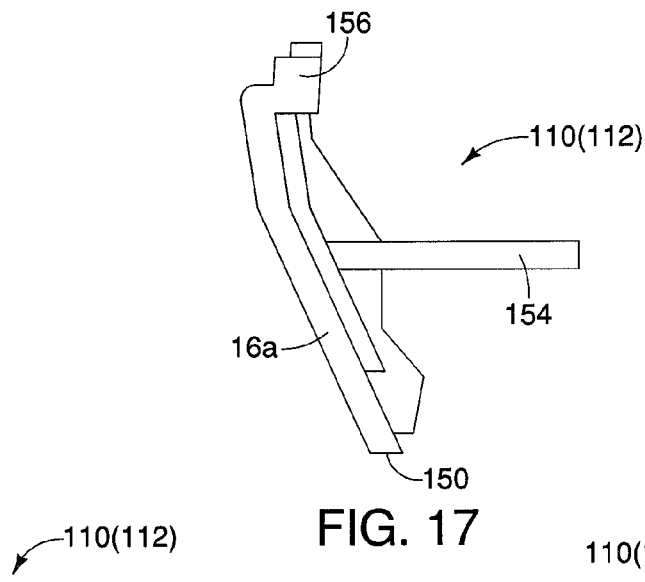
FIG. 17 is a bottom view of the first side trim panel showing one of the attachment flanges and the retaining lip in accordance with the embodiment.
Figure 18:
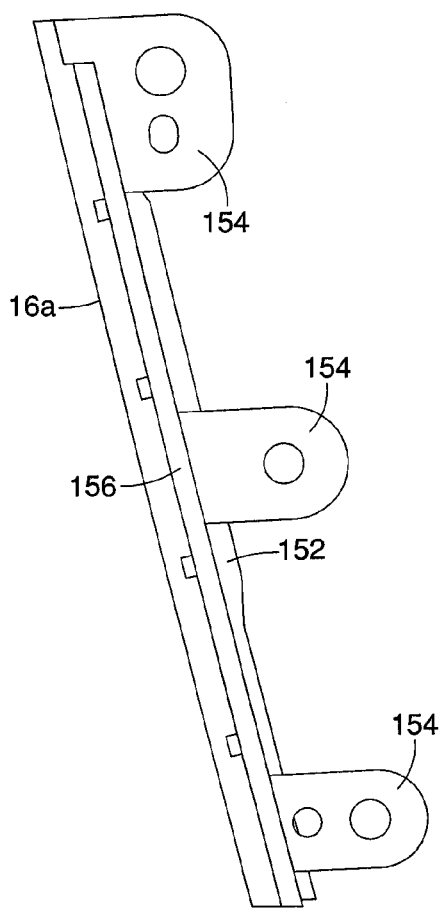
FIG. 18 is a rear view of the first side trim panel showing the attachment flanges and the retaining lip in accordance with the embodiment.
Figure 19:
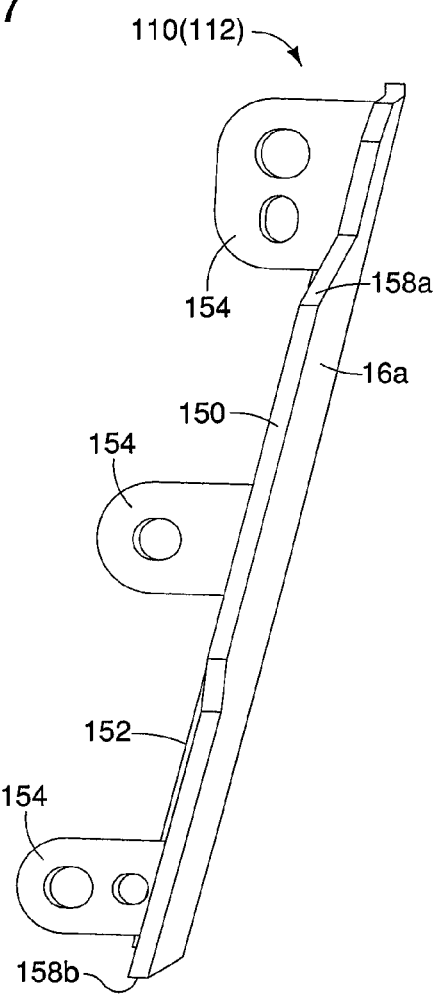
FIG. 19 is a front view of the first side trim panel showing the attachment flanges in accordance with the embodiment.
Figure 23:
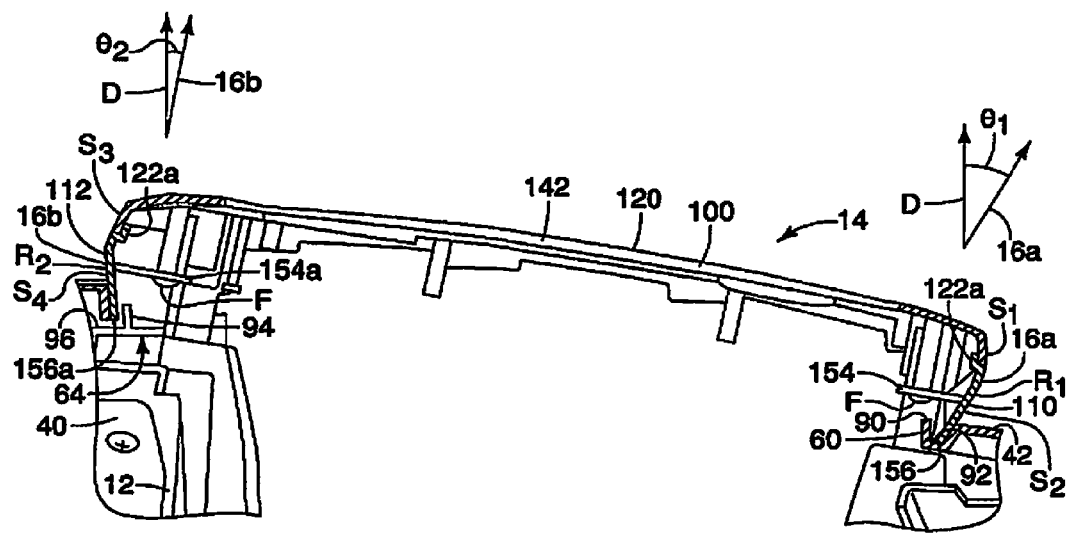
FIG. 23 is a cross-sectional view of the center stack of the instrument panel taken along the line 23-23 in FIG. 1 showing the first side trim panel retained in the first retaining portion of the center stack supporting section and the second side trim panel retained in the second retaining portion of the center stack supporting section in accordance with the embodiment.

The upper portion 130, the lower first side portion 134a, the upper first side portion 134b, the lower second side portion 136a and the upper second side portion 136b of the peripheral edge 124 all have rounded contours. The side trim surface 16a is defined on the first side trim panel 110. As shown in FIGS. 14 and 23, the side trim surface 16a includes a first section $S_1$ and a second section $S_2$ that is inclined with respect to the first section $S_1$. The first side trim panel 110 basically joins with the lower first side portion 134a such that the side trim surface 16a, the lower first side portion 134a of the peripheral edge 124 and the main trim surface 120 of the main portion 100 of the center stack assembly 14 define a continuous, uninterrupted and contoured appearance. More specifically, the first section $S_1$ and the second section $S_2$ of the side trim surface 16a have the appearance of being seamless with the lower first side portion 134a of the peripheral edge 124 and the main trim surface 120 of the main portion 100 of the center stack assembly 14.

Figure 22:
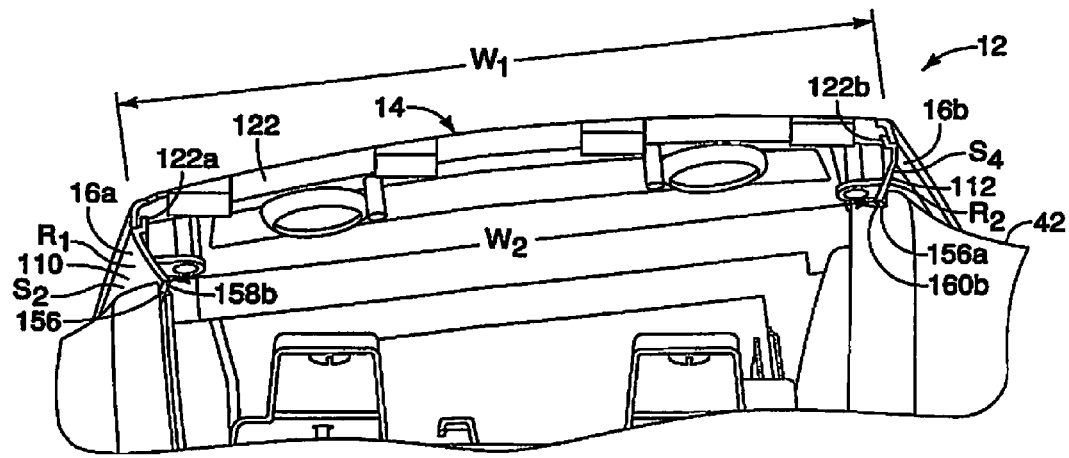
FIG. 22 is a bottom view of the center stack supporting section of the instrument panel showing the first side trim panel and the second side trim panel attached to the main portion of the center stack assembly, with the first side trim panel and the second side trim panel contacting respective sides of the trim surface of the center stack supporting section of the instrument panel in accordance with the embodiment.

The side trim surface 16b is defined on the second side trim panel 112. As shown in FIGS. 14 and 23, the side trim surface 16b includes a third section $S_3$ and a fourth section $S_4$ that is inclined with respect to the third section $S_3$. The second side trim panel 112 basically joins with the lower second side portion 136a such that the side trim surface 16b, the lower second side portion 136a of the peripheral edge 124 and the main trim surface 120 of the main portion 100 of the center stack assembly 14 define a continuous, uninterrupted and contoured appearance. More specifically, the third section $S_3$ and the fourth section $S_4$ of the side trim surface 16b have the appearance of being seamless with the lower second side portion 136a of the peripheral edge 124 and the main trim surface 120 of the main portion 100 of the center stack assembly 14. As is shown in FIGS. 22 and 23, the first section $S_1$ of the side trim surface 16a and the third section $S_3$ of the side trim surface 16b diverge away from one another in a direction moving away from the attachment surface 122 of the main portion 100 in the vehicle longitudinal direction D. Further, the second section $S_2$ of the side trim surface 16a and the fourth section $S_4$ of the side trim surface 16b are inclined toward one another such that the second section $S_2$ of the side trim surface 16a and the fourth section $S_4$ of the side trim surface 16b converge toward one another in a direction moving away from the attachment surface 122 of the main portion 100 and away from the first section $S_1$ and the third section $S_3$, respectively, in the vehicle longitudinal direction D. As shown in FIGS. 22 and 23, the second section $S_2$ of the side trim surface 16a and an adjacent portion of the trim surface 42 of the main body 38 of the instrument panel 12 define a first recessed area $R_1$. Similarly, the fourth section $S_4$ of the side trim surface 16b and adjacent portions of the trim surface 42 of the main body 38 of the instrument panel 12 define a second recessed area $R_2$. The first recessed area $R_1$ and the second recessed area $R_2$ are exposed within the passenger compartment 26 rearward of the trim surface 42 of the main body 38 of the instrument panel 12.

As shown in FIG. 3, the main trim surface 120 is inclined with respect to vertical V by an angle $\alpha$ that is between 10 and 20 degrees. In the depicted embodiment, the angle $\alpha$ is approximately 15 degrees, but can be any value between 10 and 20 degrees. Consequently, the upper portion 130 of the peripheral edge 124 of the main trim surface 120 is located closer to the dash wall 24 (more forward) than the bottom portion 132 of the peripheral edge 124 of the main trim surface 120 relative to the vehicle longitudinal direction D (FIG. 2).

As shown in FIG. 2, the main trim surface 120 is also angularly offset from a vehicle lateral direction L by an angle $\beta$, where the vehicle lateral direction L is a side-to-side direction of the vehicle 10 perpendicular to the vehicle longitudinal direction D. Hence, the lower first side portion 134a is closer to the dash wall 24 (more forward) than the lower second side portion 136a. The angle $\beta$ can be between 5 and 10 degrees. However, in the depicted embodiment, the angle $\beta$ is 7 degrees.

The attachment surface 122 includes a plurality of snap fitting projections 138 that are oriented to align and fit into the attachment apertures 80 of the flanges 70a, 70b, 72a and 72b at the central opening 66 of the center stack supporting section 50 of the main body 38 of the instrument panel with the center stack assembly 14 installed to the instrument panel 12. As shown in FIG. 14, at the lower first side portion 134a, the attachment surface 122 includes a recess 122a that is configured to receive a portion of the first side trim panel 110, as is described below. As is shown in FIGS. 14 and 22, at the lower second side portion 136a, the attachment surface 122 includes a recess 122b that is configured to receive a portion of the second side trim panel 112, as is described below.

The upper portion 130 of the peripheral edge 124 of the main portion 100 is contoured and dimensioned to mate with the trim panel 18, which is in turn contoured and dimensioned to mate with the central rearward portion 44c of the upper deck 44 of the main body 38 of the instrument panel 12 with the center stack assembly 14 and the trim panel 18 completely installed to the instrument panel 12. The bottom portion 132 includes a flange 132a (FIG. 10) that has a plurality of attachment apertures 132b that mate with, for example, snap-fitting projections (not shown) of the front section 30 of the center console 28 with the center stack assembly 14 completely installed to the instrument panel 12 and the center console 28.

Figure 10:
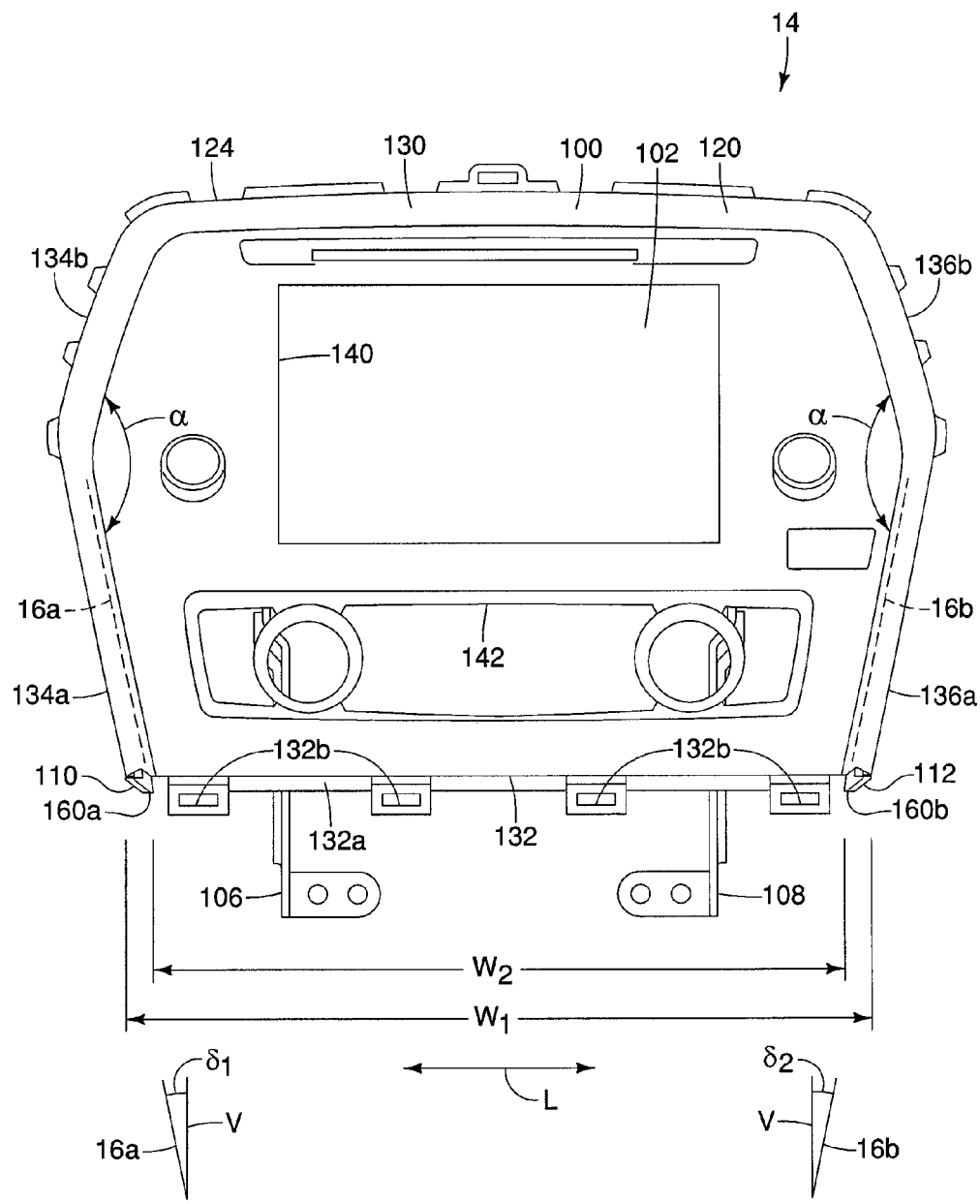
FIG. 10 is a front view of the center stack assembly showing a trim surface of the main portion and a peripheral edge of the trim surface in accordance with the embodiment.

As shown in FIG. 10, the lower first side portion 134a and the upper first side portion 134b of the peripheral edge 124 are not linearly aligned. Rather, an angle $\gamma$ is formed between the lower first side portion 134a and the upper first side portion 134b. The angle $\gamma$ can be between 130 and 170 degrees. In the depicted embodiment, the angle $\gamma$ is approximately 150 degrees. The angle $\gamma$ is similarly formed between the lower second side portion 136a and the upper second side portion 136b such that the main trim surface 120 has a symmetrical appearance.

The upper first side portion 134b is contoured and dimensioned to mate with the adjacent portion of the trim panel 18 which mates with an adjacent portion of the trim surface 42 extending from an upper portion of the instrument cluster supporting section 46 with the center stack assembly 14 completely installed to the instrument panel 12. The upper second side portion 136b is contoured and dimensioned to mate with the adjacent portion of the trim panel 18 which mates with an adjacent portion of the trim surface 42 extending from an upper portion of the storage compartment supporting section 48 with the center stack assembly 14 completely installed to the instrument panel 12.

The lower first side portion 134a is spaced apart from the adjacent portion of the trim surface 42 extending from a lower portion of the instrument cluster supporting section 46 with the center stack assembly 14 completely installed to the instrument panel 12. More specifically, the upper portion 130, the lower first side portion 134a, the upper first side portion 134b, the lower second side portion 136a and the upper second side portion 136b of the peripheral edge 124 are either co-planar or all intersect with a plane that extends through at least the lower first side portion 134a and the lower second side portion 136a. In other words, all portions of the peripheral edge 124 are approximately co-planar or are in fact co-planar, depending upon the overall design of the center stack assembly 14. However, the lower areas of the trim surface 42 adjacent to either side of the center stack support section 50 curve downward and in a forward direction relative to the vehicle body direction D. Hence there is a gap between the lower first side portion 134a and the adjacent portion of the trim surface 42. This gap is filled by the first side trim panel 110 as shown in FIG. 22 and described below.

The lower second side portion 136a is similarly spaced apart from the adjacent portion of the trim surface 42 with the center stack assembly 14 completely installed to the instrument panel 12. Hence there is a gap between the lower second side portion 136a and the adjacent portion of the trim surface 42. This gap is filled by the second side trim panel 112 as shown in FIG. 22 and described below.

Figure 9:
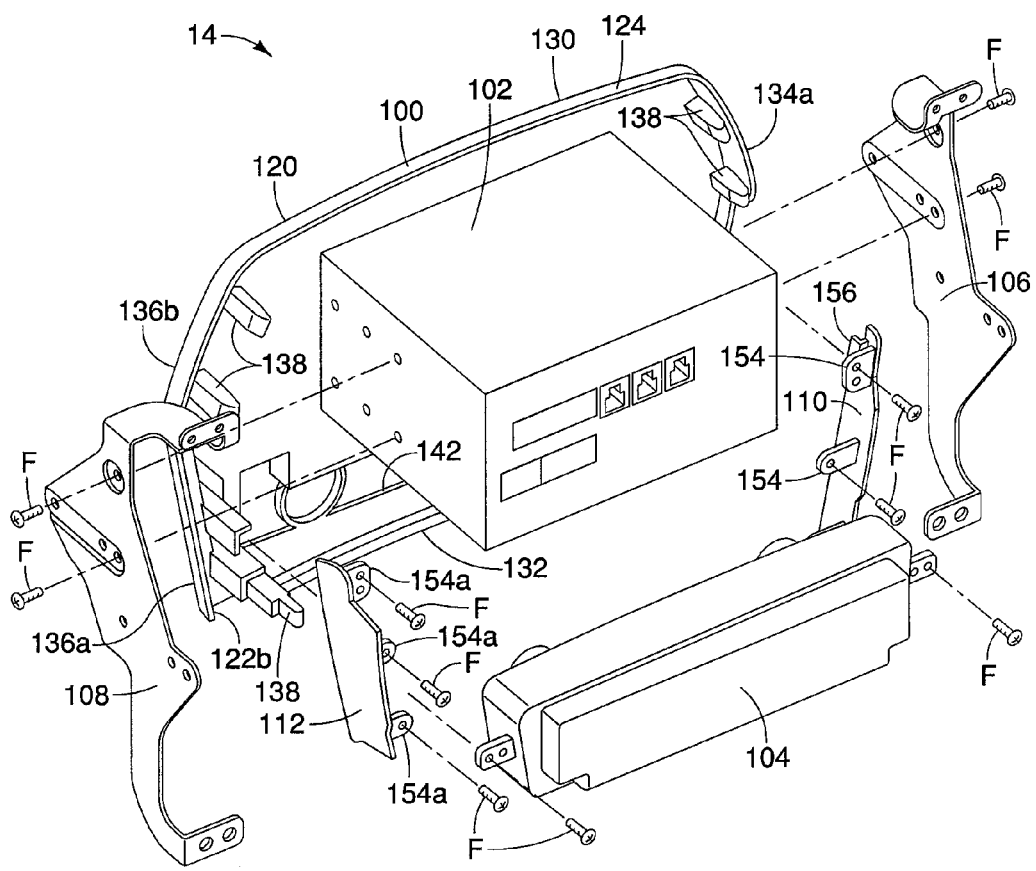
FIG. 9 is an exploded perspective view of the center stack assembly removed from the instrument panel showing an attachment surface of a main portion of the center stack assembly, attachment brackets, an audio/video device, an HVAC controller, a first side trim panel and a second side trim panel in accordance with the embodiment.

As indicated in FIGS. 9 and 10, the audio/video device 102 is dimensioned to align with an aperture 140 formed in the main portion 100 of the center stack assembly 14. The audio/video device 102 is fixedly attached to the attachment surface 122 of the main portion 100 by fasteners (not shown) or by snap fitting projections (not shown).

The HVAC controller 104 is dimensioned to align with an aperture 142 formed in the main portion 100 of the center stack assembly 14. The HVAC controller 104 is fixedly attached to the attachment surface 122 of the main portion 100 by fasteners F.

As shown in FIG. 9, the attachment bracket 106 is fixedly attached to a first side of the audio/video device 102 by fasteners F. An upper end of the attachment bracket 106 includes a fastener 106a and an adjacent alignment aperture. A lower end of the attachment bracket 106 includes a fastener 106b and an adjacent alignment aperture. Similarly, the attachment bracket 108 is fixedly attached to a second side of the audio/video device 102 by fasteners F. An upper end of the attachment bracket 108 includes a fastener 108a and an adjacent alignment aperture. A lower end of the attachment bracket 108 includes a fastener 108b and an adjacent alignment aperture. The first side trim panel 110 and the second side trim panel 112 are also fixedly attached to the attachment surface 122 of the main portion 100 by fasteners F.

A description of the first side trim panel 110 and the second side trim panel 112 is now provided with specific reference to 10-23. The first side trim panel 110 and the second side trim panel 112 are fixed to opposite sides of the attachment surface 122 such that the second side trim panel 112 is opposite and faces the first side trim panel 110.

Figure 11:
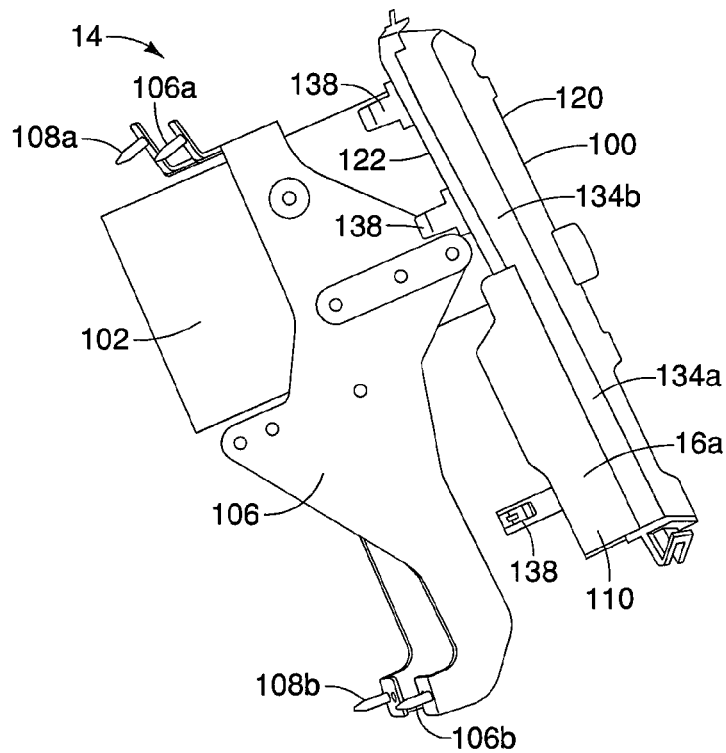
FIG. 11 is a first side view of the center stack assembly showing the first side trim panel attached to the main portion in accordance with the embodiment.
Figure 12:
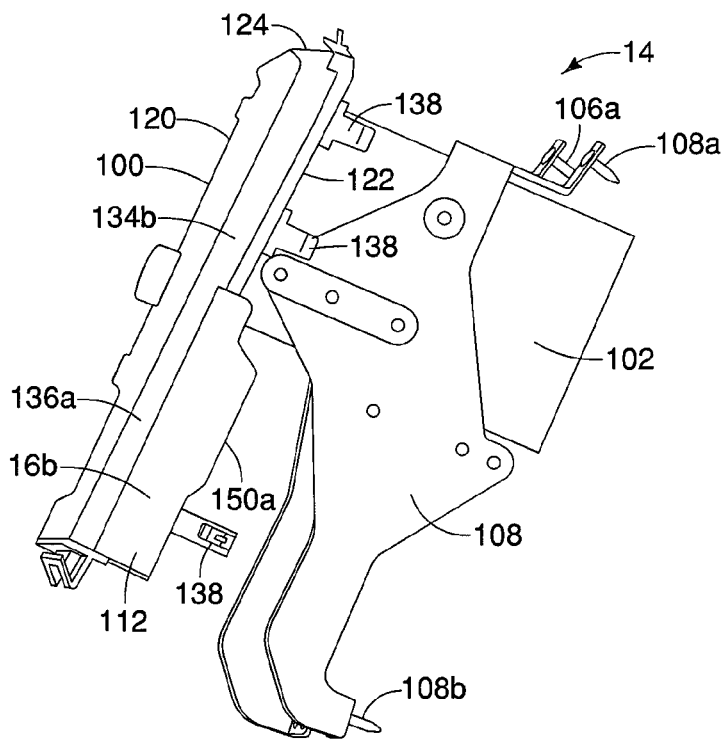
FIG. 12 is a second side view of the center stack assembly showing the second side trim panel attached to the main portion in accordance with the embodiment.
Figure 13:
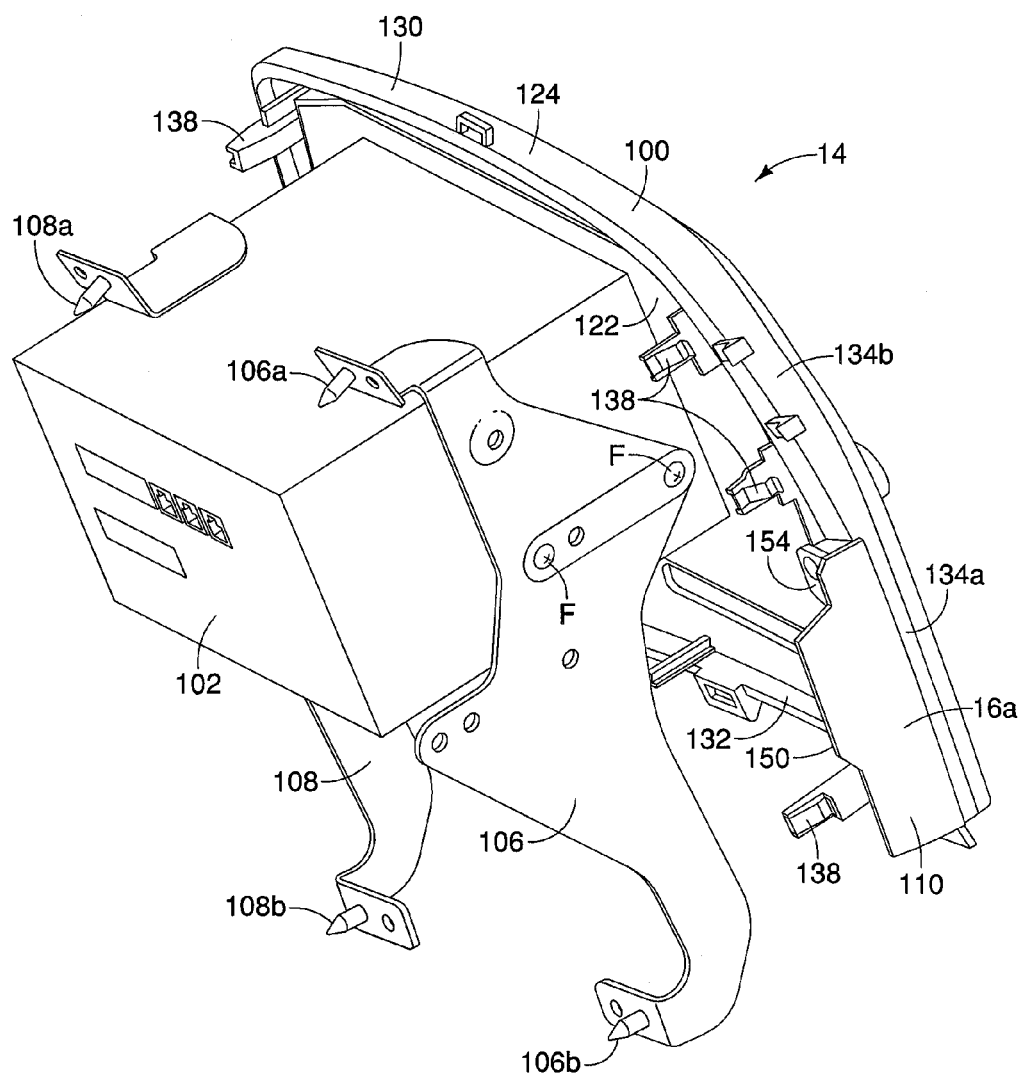
FIG. 13 is a perspective view of the center stack assembly showing the first side trim panel, the audio/video device and the attachment brackets attached to the audio/video device in accordance with the embodiment.

As shown in FIG. 11, the first side trim panel 110 is basically a first side trim wall that intersects the main portion 100 along the lower first side portion 134a of the peripheral edge 124. The side trim surface 16a defined by the first side trim panel 110 joins with the surface of the lower first side portion 134a of the peripheral edge 124. As shown in FIG. 12, the second side trim panel 112 is basically a second side trim wall that intersects the main portion 100 along the lower second side portion 136a of the peripheral edge 124. The side trim surface 16b defined by the second side trim panel 112 joins with the surface of the lower second side portion 136a of the peripheral edge 124.

As shown in FIG. 14, the first side trim panel 110 and the second side trim panel 112 are inclined toward one another in the vehicle longitudinal direction D. More specifically, the first side trim panel 110 and the second side trim panel 112 converge toward one another in a direction moving away from the attachment surface 122 of the main portion 100 in a vehicle longitudinal direction D.

The first side trim panel 110 and the second side trim panel 112 are basically symmetrical mirror images of one another. Therefore description of one applies equally to the other. The first side trim panel 110 is described below, however, it should be understood that the second side trim panel 112 is a geometric mirror image of the first side trim panel 112.

As shown in FIGS. 15-19, the first side trim panel 110 includes the side trim surface 16a, an upright edge 150, an inner surface 152 with a plurality of flanges 154 extending therefrom and a retaining lip 156. The upright edge 150 has an upper end 158a and a lower end 158b. Similarly as shown in FIGS. 12, 21, 22 and 23, the second side trim panel 112 includes the side trim surface 16b, an upright edge 150a, an inner surface 152a with a plurality of flanges 154a extending therefrom and a retaining lip 156a. The upright edge 150a has an upper end 160a and a lower end 160b.

Figure 21:
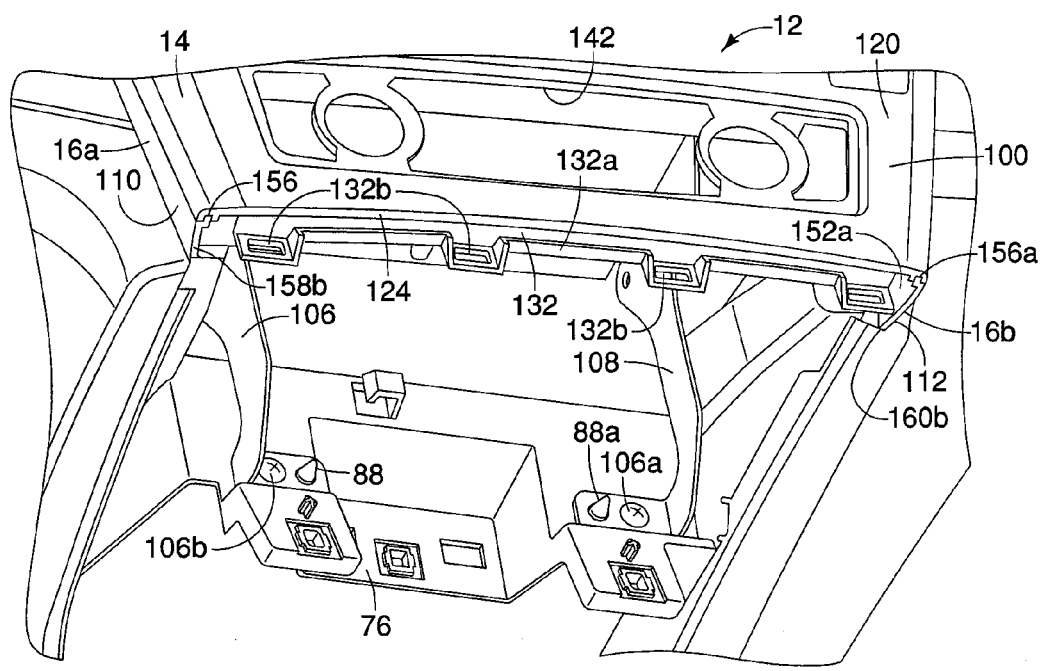
FIG. 21 is a perspective view of a lower area of the center stack supporting section of the instrument panel showing the attachment brackets of the center stack assembly attached to a lower flange of the instrument panel in accordance with the embodiment.

With the center stack assembly 14 installed to the instrument panel 12, the upright edge 150 of the first side trim panel 110 extends into the recess 92 of the first retaining portion 60, as shown in FIGS. 21 and 23. Similarly, the upright edge 150a of the second side trim panel 112 extends into the recess 96 of the second retaining portion 64, as shown in FIGS. 21 and 23. Thus, the first side trim panel 110 and the second trim panel 112 are securely retained in position with the center stack assembly 14 fully installed to the main body 38 of the instrument panel 12.

As shown in FIGS. 10 and 14, the main trim surface 120 has a first width $W_1$ measured along the bottom portion 132 of the peripheral edge 124 from the lower first side portion 134a to the lower second side portion 136a in the vehicle lateral direction L. A second width $W_2$ is measured at a level corresponding to the first width $W_1$ from a forward lower end of the first side trim panel 110 to a forward lower end the second side trim panel 112, the first width $W_1$ being greater than the second width $W_2$. The second width $W_2$ further corresponds to the distance between the respective lower ends 158b and 160b of the upright edges 150 and 150a of the first and second side trim panels 110 and 112.

Further, as is shown in FIG. 14, the main trim surface 120 has a third width $W_3$ measured at approximately the level of the upper ends 158a and 160a of the upright edges 150 and 150a of the first and second side trim panels 110 and 112 in the vehicle lateral direction L. A fourth width $W_4$ is measured between the upper ends 158a and 160a of the upright edges 150 and 150a of the first and second side trim panels 110 and 112 in the vehicle lateral direction L. The third width $W_3$ is greater than the fourth width $W_4$.

As described above and shown in FIG. 2, the center stack assembly 14 is angularly offset relative to vehicle lateral direction L by the angle β. Similarly, the center stack assembly 14 is angularly offset relative the vehicle longitudinal direction D by a angle that is complementary to the angle β (90 degrees−β), such that the first side trim panel 110 and the second side trim panel 112 are not visible from a location rearward from the instrument cluster supporting section 50 and along a line $L_1$ (FIG. 2) normal to a plane defined by the main trim surface 120 of the main portion 100 of the center stack assembly 14.

In should be understood that the side trim surface 16a of the first side trim panel 110 and the side trim surface 16b of the second side trim panel 112 and the main trim surface 120 of the center stack assembly 14 are all exposed within the passenger compartment 26 when the center stack assembly 14 is installed to the center stack supporting section 50 of the instrument panel 12. However, the first side trim panel 110 and the second side trim panel 112 are not visible because of the angle β which results in them converging toward one another moving away from the main portion 100 of the center stack assembly 14.

Further, the orientation and location of the first side trim panel 110 and the second side trim panel 112 are such that they are not visible from a location rearward from the instrument cluster supporting section 46 and along the line $L_1$ (FIG. 2) normal to a plane P defined by the main trim surface 120 of the main portion 100 of the center stack assembly 14. More specifically, the second section $S_2$ of the side trim surface 16a, the fourth section $S_4$ of the side trim surface 16b, the first recessed area $R_1$ and the second recessed area $R_1$ are hidden from view by the main trim surface 120 of the center stack assembly 14 as viewed from an area rearward of the center stack assembly 14 along the line $L_1$, which is normal to a plane P defined by the main trim surface 120 of the center stack assembly 14.

As shown in FIG. 9, the first side trim panel 110 is attached to the main portion 100 by fasteners F that are inserted through apertures in the flanges 154. Similarly, the second side trim panel 112 is attached to the main portion 100 by fasteners F that are inserted through apertures in the flanges 154a.

Figure 20:
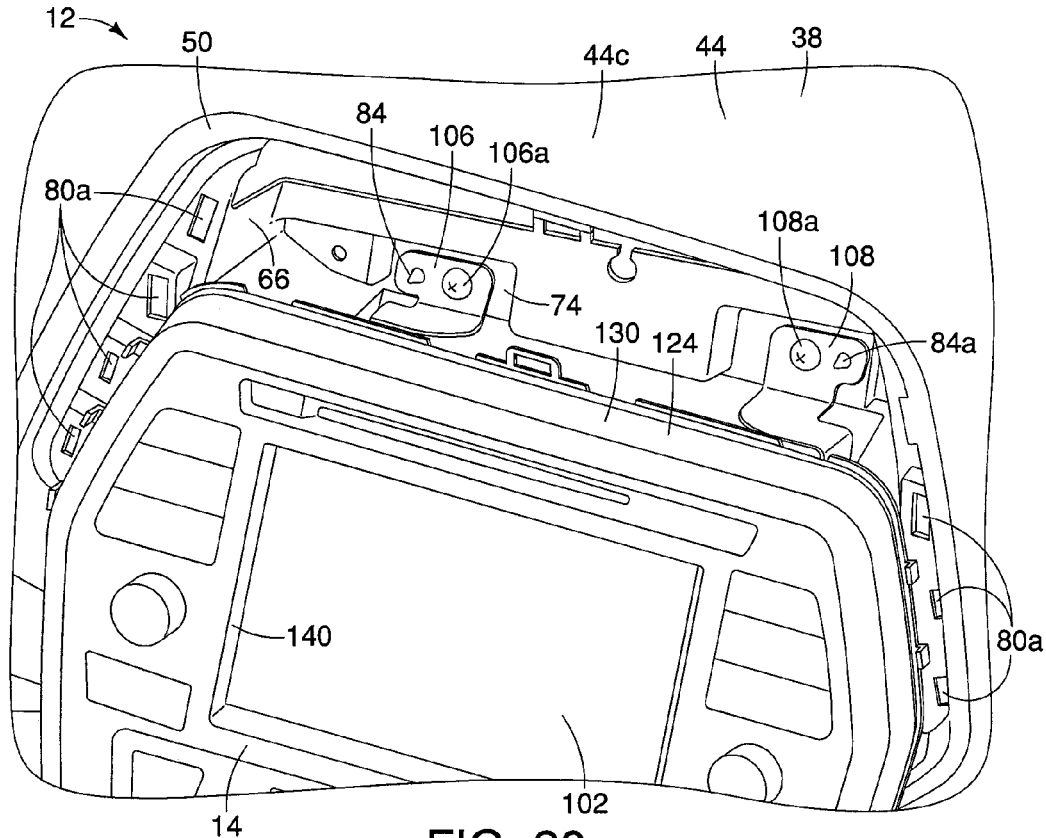
FIG. 20 is a perspective view of an upper area of the center stack supporting section of the instrument panel showing the attachment brackets of the center stack assembly attached to an upper flange of the instrument panel in accordance with the embodiment.

As shown in FIG. 20, when the center stack assembly 14 is installed to the center stack supporting section 50, the fastener 106a of the attachment bracket 106 is fitted into the aperture 82 of the flange 74 and the alignment projection 84 extends into the alignment aperture adjacent to the fastener 106a. Similarly, the fastener 108a of the attachment bracket 108 is fitted into the aperture 82a of the flange 74 and the alignment projection 84a extends into the alignment aperture adjacent to the fastener 108a.

As shown in FIG. 21, when the center stack assembly 14 is installed to the center stack supporting section 50, the fastener 106b of the attachment bracket 106 is fitted into the aperture 86 of the flange 76 and the alignment projection 88 extends into the alignment aperture adjacent to the fastener 106b. Similarly, the fastener 108b of the attachment bracket 108 is fitted into the aperture 86a of the flange 76 and the alignment projection 88aa extends into the alignment aperture adjacent to the fastener 108b.

With the center stack assembly 14 attached to the center stack supporting section 50 and covering the central opening 66, the main trim surface 120 is spaced apart from the trim surface 42 of the instrument panel 12 and extends further rearward that adjacent areas of the trim surface 42. The first side trim panel 110 extends from the lower first side portion 134a of the main trim surface 120 of the center stack assembly 14 to trim surface 42 of the instrument panel 12 at the driver's side of the central opening 66. As well, the second side trim panel 112 extends from the lower second side portion 136a to trim surface 42 of the instrument panel 12 at the passenger's side of the central opening 66.

As shown in FIG. 23, the side trim surface 16a is inclined with respect to the vehicle longitudinal direction D by an angle $\theta_1$ and the side trim surface 16b is inclined with respect to the vehicle longitudinal direction D by an angle $\theta_2$ where the angle $\theta_1$ and is greater than the angle $\theta_2$. In the depicted embodiment, the angle $\theta_1$ can be between 15 and 35 degrees. However, in the depicted embodiment the angle $\theta_1$ is approximately 22 degrees. The angle $\theta_2$ can be between 0 and 10 degrees. In the depicted embodiment, the angle $\theta_2$ is approximately 3 degrees.

As shown in FIG. 10, the side trim surface 16a is inclined with respect to vertical V by an angle $\delta_1$ and the side trim surface 16b is inclined with respect to the vertical V by an angle $\delta_2$ where the angle $\delta_1$ and the angle $\delta_2$ are equal. However, in an alternative embodiment the angles $\delta_1$ and $\delta_2$ can be unequal. The angle $\delta_1$ can be between 5 degrees and 20 degrees. However, in the depicted embodiment, the angle $\delta_1$ is approximately 15 degrees.

As is shown in FIG. 2, areas of the trim surface 42 of the instrument panel 12 adjacent to each lateral side of the central opening 66 have contoured shapes that extend rearward approaching the central opening 66 as viewed from above. However, the lower first side portion 134a, the lower second side portion 136a and the bottom portion 132 of the peripheral edge 124 of the main portion 100 of the center stack assembly 14 are all located rearward of the trim surface 42 of the instrument panel 12 with the center stack assembly 14 installed to the instrument panel 12.

The first side trim panel 110 and second side trim panel 112 are basically hidden from the driver's sight when the driver is seated in the driver's seat $S_D$. Hence, the center stack assembly 14 has a floating appearance since connection between the lower side surfaces 16a and 16b s of the center stack assembly 14 are hidden from the driver's view.

The various portions of the vehicle 10 and features of the vehicle 10 within the passenger compartment 26, other than the instrument panel 12 and the center stack assembly 14, are conventional components that are well known in the art. Since these various portions and features are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle instrument panel assembly. Accordingly, these terms, as utilized to describe the present invention should be interpreted relative to a vehicle equipped with the vehicle instrument panel assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle instrument panel assembly comprising:
a center stack assembly having a main portion that includes a main trim surface and an attachment surface on an opposite side of the main portion from the main trim surface with a peripheral edge surrounding the main trim surface, the peripheral edge including an upper portion, a bottom portion, a lower first side portion, an upper first side portion, a lower second side portion laterally opposite the lower first side portion and an upper second side portion laterally opposite the upper first side portion, the center stack assembly further including a first side trim surface and a second side trim surface opposite the first side trim surface, the first side trim surface and the second side trim surface being located on a side of the main portion defining the attachment surface, the first side trim surface intersecting the main portion along the lower first side portion of the peripheral edge, and the second side trim surface intersecting the main trim surface along the lower second side portion of the peripheral edge, the first side trim surface having a first section and a second section that is inclined relative to the first section, the second side trim surface having a third section and a fourth section that is inclined relative to the third section, the first section of the first side trim surface and the third section of the second side trim surface diverging away from one another in a direction moving away from the attachment surface of the main portion in a vehicle longitudinal direction, the second section of the first side trim surface and the fourth section of the second side trim surface being inclined toward one another such that the second section of the first side trim surface and the fourth section of the second side trim surface converge toward one another in the direction moving away from the attachment surface of the main portion and away from the first section and the third section, respectively, in the vehicle longitudinal direction.

2. The vehicle instrument panel assembly according to claim 1, wherein
the second section of the first side trim surface is inclined with respect to the vehicle longitudinal direction by a first angle and the fourth section of the second side trim surface is inclined with respect to the vehicle longitudinal direction by second angle, the first angle being greater than the second angle.

3. The vehicle instrument panel assembly according to claim 2, wherein
the first angle is between 15 degrees and 35 degrees, and the second angle is between 1 and 10 degrees.

4. The vehicle instrument panel assembly according to claim 3, wherein
the second section of the first side trim surface is inclined with respect to vertical by a third angle of between 5 degrees and 20 degrees, and
the fourth section of the second side trim surface is inclined with respect to vertical by a fourth angle of between 5 degrees and 20 degrees such that the second section of the first side trim surface and the fourth section of the second side trim surface also converge toward one another in directions moving downward.

5. The vehicle instrument panel assembly according to claim 4, wherein
the third angle is 15 degrees and the fourth angle is 15 degrees.

6. The vehicle instrument panel assembly according to claim 1, wherein
the center stack assembly includes an HVAC control section and an audio/video section.

7. The vehicle instrument panel assembly according to claim 6, wherein
the center stack assembly includes at least one attachment bracket with a first end attached to the audio/video section and a second end that includes an instrument panel attachment structure.

8. The vehicle instrument panel assembly according to claim 1, wherein
the bottom portion of the peripheral edge of the main portion of the center stack assembly includes a center console attachment structure.

9. The vehicle instrument panel assembly according to claim 1, further comprising
an instrument panel having a main body installed within a passenger compartment of a vehicle, the main body having an instrument cluster supporting section, a glove box supporting section and a center stack supporting section located between the instrument cluster supporting section and the glove box supporting section, with the center stack assembly being supported to the center stack supporting section.

10. The vehicle instrument panel assembly according to claim 9, wherein
the center stack assembly is angularly offset relative to the vehicle longitudinal direction such that the second section of the first side trim surface and the fourth section of the second side trim surface are not visible from a location rearward from the instrument cluster supporting section and along a line normal to a plane defined by the main trim surface of the main portion of the center stack assembly.

11. The vehicle instrument panel assembly according to claim 1, further comprising
an instrument panel having a main body installed within a passenger compartment of a vehicle, the main body having a trim surface exposed within the passenger compartment, a center stack supporting section and a dash wall facing surface, with a central opening defined by the main body that extends from the dash wall facing surface to the trim surface,
the center stack assembly being attached to the center stack supporting section and covering the central opening, with the main trim surface being spaced apart from the trim surface of the instrument panel such that the first side trim surface extends from the lower first side portion to the trim surface of the instrument panel at a first side of the central opening and the second side trim surface extends from the lower second side portion to the trim surface of the instrument panel at a second side of the central opening.

12. The vehicle instrument panel assembly according to claim 11, wherein
a first side trim panel defines the second section of the first side trim surface and a second side trim panel defines the fourth section of the second side trim surface, and
the first side trim panel, the second side trim panel, the main trim surface of the main portion and the trim surface of the instrument panel are all exposed within the passenger compartment when the center stack assembly is installed to the center stack supporting section of the instrument panel.

13. The vehicle instrument panel assembly according to claim 11, wherein
areas of the trim surface of the instrument panel adjacent to each lateral side of the central opening have contoured shapes that extend rearward approaching the central opening, as viewed from above, and
the lower first side portion, the lower second side portion and the bottom portion of the peripheral edge of the main trim surface are all located rearward of the trim surface of the instrument panel with the center stack assembly installed to the instrument panel, as viewed from above.

14. The vehicle instrument panel assembly according to claim 11, wherein the trim surface of the instrument panel defines a first recess adjacent to a first lateral side of the central opening and a second recess adjacent to a second lateral side of the central opening, with an upright edge of the second section of the first side trim surface extending into the first recess and an upright edge of the fourth section of the second side trim surface extending into the second recess with the center stack assembly installed to the main body of the instrument panel.

15. A vehicle instrument panel assembly comprising:

an instrument panel main body installed within a passenger compartment of a vehicle and having a dash wall facing surface, a trim surface exposed within the passenger compartment opposite the dash wall facing surface and a center stack supporting section, the trim surface including a central opening that coincides with at least part of the center stack supporting section; and a center stack assembly installed to the center stack supporting section and having a main trim surface with a peripheral edge surrounding the main trim surface, the peripheral edge including an upper portion, a bottom portion, a lower first side portion, an upper first side portion, a lower second side portion laterally opposite the lower first side portion and an upper second side portion laterally opposite the upper first side portion, the bottom portion of the peripheral edge being located rearward of the trim surface of the instrument panel main body in a vehicle longitudinal direction by a predetermined distance, the center stack assembly also including a first side trim surface that extends from the lower first side portion to the trim surface of the instrument panel main body and a second side trim surface that extends from the lower second side portion of the main trim surface to the trim surface of the instrument panel main body, the main trim surface having a first width measured proximate the bottom portion of the peripheral edge from the lower first side portion to the lower side second portion in a vehicle lateral direction, and a second width is measured at a level corresponding to the first width from a forward end of the lower first side portion to a forward end the lower side second portion, the first width being greater than the second width such that a section of the first side trim surface and an adjacent portion of the trim surface of the instrument panel main body define a first recessed area, a section of the second side trim surface and an adjacent portion of the trim surface of the instrument panel main body define a second recessed area, the first recessed area and the second recessed area being exposed within the passenger compartment rearward of the trim surface of the instrument panel main body, and the first recessed area and the second recessed area are hidden from view by the main trim surface of the center stack assembly as viewed from an area rearward of the center stack assembly along a line normal to a plane defined by the main trim surface of the center stack assembly.

16. The vehicle instrument panel assembly according to claim 15, wherein the center stack assembly includes a main portion that defines the main trim surface, a first side trim panel defining the first side trim surface, and a second side trim panel that defines the second side trim surface, the first side trim panel and the second side trim panel being attached by mechanical fasteners to the main portion of the center stack assembly.

17. The vehicle instrument panel assembly according to claim 16, wherein the instrument panel main body includes an instrument cluster supporting section and a storage compartment supporting section, with the center stack supporting section being located between the instrument cluster supporting section and the storage compartment supporting section.

18. The vehicle instrument panel assembly according to claim 17, wherein the instrument cluster supporting section includes a first retaining portion with a portion of the first trim panel being retained therein, and the storage compartment supporting section includes a second retaining portion with a portion of the second trim panel being retained therein.

19. The vehicle instrument panel assembly according to claim 11, wherein the second section of the first side trim surface and an adjacent portion of the trim surface of the instrument panel main body define a first recessed area, the fourth section of the second side trim surface and an adjacent portion of the trim surface of the instrument panel main body defines a second recessed area, the first recessed area and the second recessed area being exposed within the passenger compartment rearward of the trim surface of the instrument panel main body, and the first recessed area and the second recessed area are hidden from view by the main trim surface of the center stack assembly as viewed from an area rearward of the center stack assembly along a line normal to a plane defined by the main trim surface of the center stack assembly.

* * * * *